Patented Dec. 7, 1943

2,336,387

UNITED STATES PATENT OFFICE

2,336,387

DERIVATIVES OF UNSATURATED COMPOUNDS AND METHOD OF MAKING

Leland James Beckham, Geddes, N. Y., assignor to The Solvay Process Company, New York, N. Y., a corporation of New York No Drawing. Application December 30, 1941, Serial No. 424,940

34 Claims. (Cl. 260—401)

This invention relates to new products and to a process for their preparation. It especially relates to the preparation of organic sulfonates which have characteristic surface active properties and are valuable as dispersing agents, wetting agents, and emulsifying agents.

It is an object of the invention to provide new and valuable products for detergent and related uses and to provide a process for their manufacture from inexpensive and readily available raw materials.

Further objects of the invention will be apparent from consideration of the following disclosures.

The products of the present invention are sulfitation products of nitrosyl chloride or bromide addition compounds of substituted unsaturated hydrocarbons containing at least one carboxylic substituent. Suitable carboxylic substituents are carboxylic acid radicals, carboxylic acid ester radicals, carboxylic acid salt radicals, carboxylic acid amide radicals, carboxylic acid halide radicals, and nitrile radicals. The nitrile radical earns its right to inclusion in this group by virtue of the ease with which it is hydrolyzed either to the carboxylic acid group or to a carboxylic acid salt group or to a carboxylic acid amide group. The sulfitation of such addition products results in the formation of mixtures of organic sulfonates containing, in addition to the carboxylic substituent radical and the sulfonate group, functional groups of the class consisting of ketone groups, amino groups, mono- and di-valent sulfamate groups, and sulfonate sulfamate groups. The several enumerated types of constituents of the mixtures are formed in varying proportions, depending upon the conditions of sulfitation.

The products obtained from substituted olefins containing not less than 10 nor more than 30 carbon atoms for each olefinic bond are especially suitable for detergent uses, not only individually but in admixture with one another in genetic proportions. Thus it is unnecessary to separate the keto derivatives or amino derivatives or the sulfamate derivatives from one another.

The products of the invention are especially suitable for use as detergents in hard waters since they possess a good resistance to calcium. The products can be used as wetting and emulsifying agents in the various wet treatment processes of the textile industry, for instance in the washing, bleaching, or dyeing of cotton, wool, silk, or synthetic textiles. They may be employed as flotation agents and emulsifying agents. The products are effective detergents whether the sulfonate radicals are hydrogen sulfonate radicals or alkali-metal or ammonium sulfonate radicals. Hereinafter, where reference is made to the "sulfonate," the term, unless otherwise indicated, is intended to include both the free acid and salt forms.

The nitrosyl halide addition products may be prepared by reaction of nitrosyl chloride or nitrosyl bromide with a substituted unsaturated hydrocarbon containing one or more like or different carboxylic radicals. In the case of the amides, N-dialkyl amides are normally preferred because of the relative stability of the dialkyl amide group under the conditions of treatment. Mixtures of the carboxylic-substituted compounds with other carboxylic-substituted compounds or with olefins or with inert diluents may be employed. The term carboxylic-substituted unsaturated hydrocarbon is used herein to designate a carboxylic-substituted hydrocarbon containing at least one non-aromatic C=C linkage in the molecule.

Suitable addition products for the sulfitation are the nitrosyl chloride and bromide addition products of esters of unsaturated long chain fatty acids, such as oleic acid or mixtures such as the alkenyl succinic acids obtained by condensation of maleic anhydride with olefin fractions obtained by cracking or dehydrogenation of natural or synthetic petroleum or by catalytic processes such as the Fischer-Tropsch synthesis, and hydrolysis of the unsaturated dicarboxylic acid anhydride formed, with saturated mono-, di-, or tri-hydroxy alcohols such as methanol, ethanol, propanol, and isopropanol, the butanols and pentanols, and glycol and glycerin and their homologs; the esters of lower unsaturated aliphatic acids such as acrylic acid and maleic acid with long chain alcohols such as lauryl alcohol, myristyl alcohol, and cetyl alcohol; the esters of saturated long chain aliphatic or alicyclic acids such as stearic acid and 3-methyl-4-dimethyl-cyclopentane-1-carboxylic acid with unsaturated alcohols such as allyl alcohol and its homologs; the esters of lower saturated fatty acids such as acetic acid and succinic acid with unsaturated long chain alcohols such as the higher homologs of allyl alcohol; the esters of unsaturated alicyclic acids such as $\Delta^2$-3-methyl-4-dimethyl-cyclopentene-1-carboxylic acid with saturated alcohols such as butanol-1; the free oleic and higher alkenyl succinic acids; and the alkali-metal salts and acid chlorides of such acids. Suitable amides may be formed from the same acids as the esters, substituting for the alcohols enumerated, corresponding amines, preferably secondary amines such as dimethyl amine, methyl butyl amine, ethyl butyl amine, etc.

The carboxylic-substituted hydrocarbons which are preferred are those containing the C=O or CN group or groups sufficiently near the ethylenic linkage or linkages to provide one or more saturated hydrocarbon radicals containing 8 or more carbon atoms in a straight chain, which may contain hydrocarbon substituent groups. Examples of the preferred type of compounds are: butyl oleate, oleic acid, methyl oleate, isopropyl oleate, allyl stearate, allyl laurate, di-n-octyl-(octenyl, nonenyl, decenyl, or undecenyl) succinate, oleic acid amide, N-methyl oleic acid amide, N-dimethyl oleic acid amide, oleic acid anhydride, oleic acid chloride, oleic acid nitrile, N-allyl lauric acid amide, N-oleyl butyric acid amide, N-methyl N-oleyl propionic acid amide, N-ethyl N-oleyl acetic acid amide, N-methyl N-lauryl 4-hexenoic acid amide, N-decyl 3-pentenoic acid amide. On the other hand, when the carboxylic and ethylenic functions occupy adjacent positions, the addition of nitrosyl halide proceeds relatively slowly. In the case of those compounds in which a carbon forming the ethylenic linkage and the carbon to which the carboxylic substituent is attached are separated by only one or two intermediate carbons, the formation of true sulfonates by the direct addition of alkali metal bisulfite to the olefinic bond is in many cases promoted by the presence of a small proportion of the NOCl addition product of the same material. In this manner mixtures of sulfonates produced by direct addition of acid sulfite to the olefinic linkage, and sulfonates containing the substituents characteristic of the sulfitation of nitrosyl halide addition products, i. e., sulfamate, keto, and amino groups, are formed. An example of such compounds is allyl laurate, in which the double bond is one carbon removed from the ester function.

The addition products may be prepared by bringing nitrosyl chloride into intimate contact with the carboxylic-substituted unsaturated hydrocarbon at ordinary temperatures; preferably temperatures between 0° C. and 40° C. The technique employed in this process may be the same as that described in my copending application Serial No. 221,707 of July 28, 1938, now U. S. Patent 2,265,993, entitled "Derivatives of Olefinic Compounds and Method of Making."

The NOCl addition products are believed to comprise largely organic nitroso chloro compounds having the chlorine atom and nitroso group upon adjacent carbon atoms, the isomeric oximes, and probably the chlor derivatives formed by substitution of chlorine for a remaining hydrogen of the nitroso-substituted carbon of the nitroso chloro compounds, and dimers of the nitroso chloro compounds. A considerable proportion of these products reacts further under the conditions of nitrosation to lose nitrogen and form products such as alpha-chlorohydrins and alpha-chloro-ketones. Hence the nitrogen content of the adduct as a whole may correspond to only 0.6 to 0.7 atom per ethylenic group.

When the substituted olefin from which the nitrosyl halide addition product is derived is an unsaturated aliphatic carboxylic acid, the carboxyl group may react during the nitrosyl halide addition reaction to form the carboxylic acid halide. In such cases the acid halide may be converted back to the carboxylic acid or its salt before or during the sulfitation.

In the manufacture of detergent products of the present invention from carboxylic-substituted unsaturated hydrocarbons containing more than one olefinic bond, i. e., non-aromatic C=C group, and containing less than 10 carbon atoms per olefinic bond, products of improved detergency are obtained if the nitrosation is restricted so as to leave a considerable degree of unsaturation in the product of nitrosation and to provide in the nitrosation product at least 10 carbon atoms per reacted unsaturated linkage.

The yield of nitrosyl halide addition product obtained in any particular instance is limited by the proportion of nitrosyl halide employed. It is normally desirable, except as noted in the preceding paragraph, to employ sufficient nitrosyl halide to secure a high proportion of the unsaturated carboxylic constituents in the form of addition products.

The time necessary to effect conversion of the substituted olefins to nitrosyl halide addition products may vary from 1 to 24 hours or more, depending upon the particular material used and the reaction conditions, for example, the intimacy of contact, the temperature, the pressure, and the physical state of the reactants. For instance, proper use of a suitable solvent accelerates the reaction, as discussed in my application Serial No. 221,707, previously referred to.

The conversion of the nitrosyl halide addition products to sulfitation products in accordance with the present invention is effected by reacting the nitrosyl halide addition product with an alkali metal or ammonium sulfite, designated generically as alkali sulfite.

The sulfitation is preferably effected in two or more stages at progressively higher temperatures from below about 50° C. in the first stage to between 65° and 130° C. in the final stage, employing an aqueous solution of sodium sulfite and sodium bisulfite, and an organic solvent such as isopropyl alcohol, as described more fully, and specifically claimed in my applications Serial Nos. 424,941, 424,942 and 424,943 of even date entitled: Organic Sulfonates and Method of Making, Manufacture of Organic Sulfonates, and Sulfitation of Organic Compounds, respectively.

The sulfitation may be conducted for a period of a few hours or may be continued for as much as two or three days. Under favorable sulfitation conditions a major proportion of the addition product may be reacted in a period between 1 and 4 hours. The ultimate yield may be increased by extending the reaction period but the reaction becomes progressively slower. Accordingly the selection of the most suitable reaction period in any particular case involves an economic balance of time versus yield.

The sulfitation may or may not affect the carboxylic substituent of the nitrosyl halide addition compound. Thus, if a carboxylic acid halide substituent is present, either as a result of preparation of the nitrosyl halide addition product from a compound initially containing such a group, or as a result of reaction of the nitrosyl halide upon a group convertable to an acyl halide group, this acyl halide radical may be converted or reverted by the sulfitation treatment to a carboxylic acid group or a carboxylic salt group. Similarly, if the carboxylic radical is a nitrile group initially, this group may be hydrolyzed in part to a carboxylic acid, carboxylic acid salt, or carboxylic acid amide group or to all three. In the event the carboxylic radical is a carboxylic acid amide group, partial hydrolysis of this group to the acid or salt group may take place. Whether the carboxylic group is such as to be hydrolyzed in whole or in part or not at all, the sulfitation products have been found to be especially valuable surface active agents.

In addition to the organic constituents of the reaction product inorganic salts will normally be present in the product as obtained in aqueous solution at the end of sulfitation; e. g., sodium chloride, formed by reaction of sodium sulfite with organic chlorine atoms, and sodium sulfite and bisulfite in excess of that reacted remain in the solution. Excess sulfite present may be oxidized to the more stable sulfate by blowing the mixture with air and the inorganic salts may be permitted to remain in the final product. Alternatively, the sulfite may be decomposed by acidification with phosphoric acid to form alkali metal phosphate which may serve as an adjuvant in the finished detergent product.

(isopropyl alcohol) in all of the preparations except the fifth, in which the solvent was methanol. After completion of the sulfitation, except with the olive oil detergent, two volumes water per volume sulfitation liquor were added and the resulting solution extracted 6 times with ethyl ether using about ½ part ether by volume per part original sulfitation liquor. Solid detergent was recovered from the extracted aqueous phase by use of a laboratory double drum drier. In the case of the detergent from olive oil, a heavy, salt-rich liquid phase was separated from the detergent-rich phase and extracted twice with ether. The extracts were mixed with the detergent-rich phase, diluted with water, extracted 6 times with ethyl ether, and the resulting aqueous phase mixed with the above mentioned heavy salt phase. Solid product was recovered by means of the drum drier.

Table 1

[Mass values are expressed in gram atoms or mols per mol of substituted olefin]

| | 1 | 2 | 3 | 4 | 5 | 6 | 7 | 8 | 9 | 10 | 11 [2] |
|---|---|---|---|---|---|---|---|---|---|---|---|
| Olefinic material | Methyl oleate | Olive oil | n-Butyl oleate | Oleic acid | Methyl oleate | Isopropyl oleate | n-Butyl oleate | ([1]) | Allyl stearate | Allyl laurate | Allyl laurate |
| Mols NOCl passed | 1.5 | 2 | 2.5 | 2.5 | 2.5 | 2.5 | 3.12 | 3.2 | 2.5 | 2.5 | 2.5 |
| Nitrosation time hours | 16 | 16 | 4 | 4 | 4 | 4 | 5 | 5 | 4 | 4 | 4 |
| Nitrosation temperature °C | 0 | 0 | 25 | 25 | 25 | 25 | 25 | 25 | 25 | 25 | 25 |
| Gram atoms N introduced | 0.68 | 0.56 | 0.42 | 0.54 | 0.41 | 0.42 | 0.47 | 0.44 | 0.14 | 0.17 | 0.19 |
| Gram atoms Cl introduced | 1.29 | 1.40 | 1.18 | 1.06 | 1.23 | 1.15 | 1.25 | 0.85 | 0.28 | 0.29 | 0.31 |
| Mols $Na_2SO_3$ | 1.29 | 1.2 | 3 | 3 | 3 | 3 | 3 | 3 | 3 | 3 | 3 |
| Mols $NaHSO_3$ | 0 | 0 | 1 | 1 | 1 | 1 | 1 | 1 | 1 | 1 | 1 |
| Mols $H_2O$ | 31 | 28 | 70 | 70 | 70 | 70 | 70 | 70 | 70 | 70 | 70 |
| Mols 2-propanol | 0 | 0 | 3 | 3 | 3 | 3 | 3 | 3 | 3 | 3 | 3 |
| Sulfitation time hours | 24 | 48 | 24 | 24 | 24 | 24 | 24 | 24 | 22 | 24 | 24 |
| Sulfitation temperature °C | 100 | 100 | 84 | 86 | 86 | 86 | 86 | 86 | 86 | 86 | 86 |
| Mol per cent yield on olefinic material | 60 | 50 | 67 | 85 | 69 | 67 | 64 | 42 | 63 | 80 | 59 |

[1] The initial material used in preparation 8 was a di-n-octyl alkenyl succinate, in which the alkenyl radicals contained between 8 and 11 carbon atoms with an average of 9½ carbon atoms per molecule, obtained by condensation of maleic anhydride with a distillate fraction of a petroleum cracking product and esterification of the anhydride product with octanol-1.

[2] In the preparation of the sulfitation product in preparation 11 an equimolal amount of unnitrosated allyl laurate was added to the product of nitrosation. The values given for proportions of sulfitation reagent and yield are based on the total allyl laurate used.

If it is desired to obtain a product relatively free from inorganic salts, the organic material can be extracted from the inorganic salts by means of an organic solvent which may be removed by vaporization.

The following examples illustrate the practice of the present invention. For simplicity of disclosure, the examples have been set forth in tabular form. The general procedure for preparation of the products in each case was as follows:

A nitrosyl chloride addition product was prepared from each of the specified carboxylic-substituted olefins by passing nitrosyl chloride into the compound at the temperature and for the time period indicated in Table 1. In the case of olive oil the high viscosity of the material made it necessary to conduct the nitrosation in a solution of three parts olive oil and two parts chloroform. The chloroform was removed by a stream of air after the nitrosation was complete. The number of gram atoms of nitrogen and chlorine introduced per mol of substituted olefin also is indicated in this table.

The reaction product, comprising the nitrosyl chloride addition product of the carboxylic-substituted olefin as well as unreacted material, was mixed with an aqueous sulfitation reagent and heated to a temperature between 84° and 100° C. for a period of time between 24 and 48 hours as indicated in the table. In each case the mixture was heated gradually to the indicated reaction temperature over a period of 1 hour. In all of the preparations, except the first two, 3 mols of organic solvent were employed to assist the sulfitation. This organic solvent was 2-propanol The relative effectiveness of a preferred product of the present invention in comparison with a similar product prepared from unsubstituted olefins is indicated by the following table showing the relative wetting time (wool) in one-hundredth minutes at concentrations between 0.31 gram per liter and 5 grams per liter.

| Wetting agent | 0.31 g.p.l. | 0.62 g.p.l. | 1.25 g.p.l. | 2.5 g.p.l. | 5 g.p.l. |
|---|---|---|---|---|---|
| Product 3 of table 1 | 20− | 8+ | 5+ | 4+ | 4+ |
| Product from unsubstituted olefin | Over 25 | 19 | 10− | 6+ | 5+ |

The products tested in these wetting tests were products prepared without removal of inorganic salts but the concentrations given are concentrations of water-soluble organic material.

I claim:

1. The sulfitation product of a nitrosyl halide addition product of a carboxylic-substituted unsaturated hydrocarbon.

2. The sulfitation product of a nitrosyl halide addition product of a carboxylic-substituted unsaturated hydrocarbon containing not less than 10 and not more than 30 carbon atoms for each olefinic bond.

3. The sulfitation product of a nitrosyl chloride addition product of a carboxylic-substituted olefin containing not less than 10 and not more than 30 carbon atoms for each olefinic bond.

4. The sulfitation product of a nitrosyl halide addition product of a carboxylic-acid-ester-substituted olefin.

5. The sulfitation product of a nitrosyl halide addition product of a carboxylic-acid-substituted olefin.

6. The sulfitation product of a nitrosyl chloride addition product of a carboxylic-acid-ester-substituted olefin containing not less than 10 and not more than 30 carbon atoms for each olefinic bond.

7. The sulfitation product of a nitrosyl chloride addition product of a carboxylic-acid-substituted olefin containing not less than 10 and not more than 30 carbon atoms for each olefinic bond.

8. The sulfitation product of a nitrosyl chloride addition product of a carboxylic-acid-ester-substituted olefin containing not more than 30 carbon atoms for each olefinic bond and containing a saturated hydrocarbon radical of not less than 8 carbon atoms in a straight chain.

9. A detergent comprising the sulfitation product of a nitrosyl chloride addition product of an ester of an unsaturated aliphatic carboxylic acid and a saturated aliphatic alcohol containing between 1 and 8 carbon atoms, said ester containing not less than 10 and not more than 30 carbon atoms for each olefinic bond.

10. A detergent comprising the sulfitation product of a nitrosyl chloride addition product of a mono-olefinic aliphatic carboxylic acid containing between 10 and 30 carbon atoms.

11. A detergent comprising the sulfitation product of a nitrosyl chloride addition product of an ester of oleic acid and a saturated aliphatic alcohol containing between 1 and 8 carbon atoms.

12. A detergent comprising the sulfitation product of a nitrosyl chloride addition product of butyl oleate.

13. A detergent comprising the sulfitation product of a nitrosyl chloride addition product of olein.

14. A detergent comprising the sulfitation product of a nitrosyl chloride addition product of oleic acid.

15. The method of making the product of claim 1, which comprises reacting with an alkali sulfite the nitrosyl halide addition product of a carboxylic-substituted unsaturated hydrocarbon.

16. The method of making the product of claim 2, which comprises reacting with an alkali sulfite the nitrosyl halide addition product of a carboxylic-substituted unsaturated hydrocarbon containing not less than 10 and not more than 30 carbon atoms for each olefinic bond.

17. The method of making the product of claim 3, which comprises reacting with an alkali sulfite the nitrosyl chloride addition product of a carboxylic-substituted olefin containing not less than 10 and not more than 30 carbon atoms for each olefinic bond.

18. The method of making the product of claim 4, which comprises reacting with an alkali sulfite the nitrosyl halide addition product of a carboxylic-acid-ester-substituted olefin.

19. The method of making the product of claim 5, which comprises reacting with an alkali sulfite the nitrosyl halide addition product of a carboxylic-acid-substituted olefin.

20. The method of making the product of claim 6, which comprises reacting with an alkali sulfite the nitrosyl chloride addition product of a carboxylic-acid-ester-substituted olefin containing not less than 10 and not more than 30 carbon atoms for each olefinic bond.

21. The method of making the product of claim 7, which comprises reacting with an alkali sulfite the nitrosyl chloride addition product of a carboxylic-acid-substituted olefin containing not less than 10 and not more than 30 carbon atoms for each olefinic bond.

22. The method of making the product of claim 8, which comprises reacting with an alkali sulfite the nitrosyl chloride addition product of a carboxylic-acid-ester-substituted olefin containing not more than 30 carbon atoms for each olefinic bond and containing a hydrocarbon radical of not less than 8 carbon atoms in a straight chain.

23. The method of making the product of claim 9, which comprises reacting with an alkali sulfite the nitrosyl chloride addition product of an ester of an unsaturated aliphatic carboxylic acid and a saturated aliphatic alcohol containing between 1 and 8 carbon atoms, said ester containing not less than 10 and not more than 30 carbon atoms for each olefinic bond.

24. The method of making the product of claim 10, which comprises reacting with an alkali sulfite the nitrosyl chloride addition product of a mono-olefinic aliphatic carboxylic acid containing between 10 and 30 carbon atoms.

25. The method of making the product of claim 11, which comprises reacting with an alkali sulfite the nitrosyl chloride addition product of an ester of oleic acid and a saturated aliphatic alcohol containing between 1 and 8 carbon atoms.

26. The method of making the product of claim 12, which comprises reacting with an alkali sulfite the nitrosyl chloride addition product of butyl oleate.

27. The method of making the product of claim 13, which comprises reacting with an alkali sulfite the nitrosyl chloride addition product of olein.

28. The method of making the product of claim 14, which comprises reacting with an alkali sulfite the nitrosyl chloride addition product of oleic acid.

29. The method of making a detergent product, which comprises reacting with an aqueous solution of an alkali sulfite at a temperature between 65° and 130° C. the nitrosyl chloride addition product of an unsaturated ester of an aliphatic carboxylic acid and an aliphatic alcohol, said ester containing not less than 10 and not more than 30 carbon atoms for each olefinic bond.

30. The method of making a detergent product, which comprises reacting with an aqueous solution of an alkali sulfite at a temperature between 65° C. and 130° C. the nitrosyl chloride addition product of an unsaturated ester of an aliphatic carboxylic acid and an aliphatic alcohol, said ester containing not less than 10 and not more than 30 carbon atoms for each olefinic bond, and separating the water-soluble portion of the reaction product from water-insoluble material.

31. The method of making a detergent product, which comprises reacting with an aqueous solution of an alkali sulfite at a temperature between 65° C. and 130° C. the nitrosyl chloride addition product of an ester of an unsaturated aliphatic carboxylic acid and a saturated aliphatic alcohol containing between 1 and 8 carbon atoms, said ester containing not less than 10 and not more than 30 carbon atoms for each olefinic group.

32. The method of making a detergent product, which comprises reacting with an aqueous solution of an alkali sulfite at a temperature between 65° C. and 130° C. the nitrosyl chloride addition product of butyl oleate.

33. The method of making a detergent product, which comprises reacting with an aqueous solution of an alkali sulfite at a temperature between 65° C. and 130° C. the nitrosyl chloride addition product of an ester of a mono-olefinic aliphatic carboxylic acid and a saturated aliphatic alcohol containing between 1 and 8 carbon atoms, said ester containing not less than 10 and not more than 30 carbon atoms for each olefinic bond, separating the water-soluble portion of the reaction product from water-insoluble material, and drying the water-soluble product.

34. The method of making a detergent product, which comprises reacting with an aqueous solution of an alkali sulfite at a temperature between 65° C. and 130° C. the nitrosyl chloride addition product of butyl oleate, separating the water-soluble portion of the reaction product from water-insoluble material, and drying the water-soluble product.

LELAND JAMES BECKHAM.